US006002759A

United States Patent [19]
Kallioniemi et al.

[11] Patent Number: 6,002,759
[45] Date of Patent: *Dec. 14, 1999

[54] PORTABILITY OF NON-GEOGRAPHIC TELEPHONE NUMBERS OF INTELLIGENT NETWORK SERVICES

[75] Inventors: Karl-Erik Kallioniemi, Skoghall; Mikael Larsson, Karlstad; Bjorn Olsson, Klässbol, all of Sweden

[73] Assignee: Telefonaktiebolaget LM Ericsson, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/764,633

[22] Filed: Dec. 11, 1996

Related U.S. Application Data

[63] Continuation-in-part of application No. 08/733,930, Oct. 18, 1996.

[51] Int. Cl.[6] .................................................... H04M 3/42
[52] U.S. Cl. ............................ 379/220; 379/207; 379/230
[58] Field of Search .................................... 379/219, 220, 379/221, 201, 207, 229, 230, 231; 455/445, 432, 433, 434, 436, 438, 439, 440

[56] References Cited

U.S. PATENT DOCUMENTS

| | | |
|---|---|---|
| 4,791,665 | 12/1988 | Bogart et al. . |
| 4,933,967 | 6/1990 | Lo et al. . |
| 5,270,701 | 12/1993 | Ito et al. . |
| 5,333,184 | 7/1994 | Doherty et al. . |
| 5,369,684 | 11/1994 | Buhl et al. . |

(List continued on next page.)

FOREIGN PATENT DOCUMENTS 44 41 753 A1 6/1995 Germany ..................... H04L 12/00

OTHER PUBLICATIONS

Australian Communications Authority, "Report on Technical Options for Mobile Number Portability Implementation in Australia", http://www.austel.gov.au/telecom/number/nbrport/accmnp.htm, Mar. 1998, pp. 1–2 and 26–39.

G. Nilsson, "Number Portability: A Networking Perspective", Telecommunications Magazine, http://www.telecoms-mag.com/marketing/articles/jul97/nilsson.html, Jul. 1997, pp. 1–6.

Sonnenberg et al., "Siemens Stromberg–Carlson's Contribution to MCI Metro's Local Number Portability Architecture Task Force Team", Feb. 1995, pp. 1–13 and attachments 1 and 2.

Masanobu Fujioka, et al, "Hierarchial and Distributed Information Handling for UPT", IEEE Network Magazine, vol. 4, No. 6, Nov. 1990, pp. 50–60.

(List continued on next page.)

*Primary Examiner*—Scott Wolinsky
*Attorney, Agent, or Firm*—Nixon & Vanderhye, P.C.

[57] ABSTRACT

A telecommunications network (10) comprises a set of telephone service operator domains (20), including domains (20A–20C) having intelligent network-type services having non-geographic telephone numbers. A call-originating domain (20G) accesses a non-geographic service number database (30G) to obtain address information concerning the domain which currently handles the called service (90). The address information obtained from the non-geographic service number database includes the address a node in the domain which handles the service, e.g., the address of a gateway node (GW), and optionally the addresses of a service switching point (SSP), a service control function (SCF), and a service data function (SDF) which handles the called service (90). When changing telephone service operators (e.g., changing to a new domain), the non-geographic service number database is updated to reflect the change. Access of the database and usage of the addresses obtained therefrom in the routing message permit the service (90) to retain the same directory number when changing telephone service operators.

38 Claims, 14 Drawing Sheets

U.S. PATENT DOCUMENTS

| | | |
|---|---|---|
| 5,400,390 | 3/1995 | Salin . |
| 5,467,381 | 11/1995 | Peltonen et al. . |
| 5,467,388 | 11/1995 | Redd, Jr. et al. . |
| 5,473,681 | 12/1995 | Partridge, III . |
| 5,475,749 | 12/1995 | Akinpelu et al. . |
| 5,506,894 | 4/1996 | Billings et al. . |
| 5,515,427 | 5/1996 | Carlsen et al. . |
| 5,533,107 | 7/1996 | Irwin et al. . |
| 5,539,817 | 7/1996 | Wilkes ................................... 379/220 |
| 5,550,910 | 8/1996 | DeJager . |
| 5,550,912 | 8/1996 | Akinpelu et al. . |
| 5,550,915 | 8/1996 | Partridge, III . |
| 5,553,129 | 9/1996 | Partridge, III . |
| 5,566,235 | 10/1996 | Hetz ....................................... 379/201 |
| 5,583,926 | 12/1996 | Venier et al. ........................... 379/201 |
| 5,598,464 | 1/1997 | Hess et al. . |
| 5,610,977 | 3/1997 | Williams et al. . |
| 5,625,681 | 4/1997 | Butler, II . |
| 5,661,792 | 8/1997 | Akinpelu et al. . |
| 5,689,555 | 11/1997 | Sonnenberg . |
| 5,696,816 | 12/1997 | Sonnenberg ............................ 379/207 |
| 5,699,416 | 12/1997 | Atkins . |
| 5,703,939 | 12/1997 | Bushnell . |
| 5,724,658 | 3/1998 | Hasan . |
| 5,732,131 | 3/1998 | Nimmagadda et al. . |
| 5,748,724 | 5/1998 | Sonnenberg ............................ 379/207 |
| 5,757,894 | 5/1998 | Kay et al. ................................ 379/207 |
| 5,758,281 | 5/1998 | Emery et al. ........................... 379/207 |
| 5,761,620 | 6/1995 | Furuya et al. . |
| 5,764,745 | 6/1998 | Chan et al. ............................. 379/207 |
| 5,768,358 | 6/1998 | Venier et al. ........................... 379/207 |
| 5,832,382 | 11/1998 | Alperovich . |
| 5,838,782 | 11/1998 | Lindquist ................................ 379/230 |
| 5,839,072 | 11/1998 | Chien . |

OTHER PUBLICATIONS

Richard Goldberg, et al, "Common Channel Signaling Interface for Local Exchange Carrier to Interexchange Carrier Interconnection", IEEE Communications Magazine, vol. 28, No. 7, Jul. 1990, pp. 64–71.

Gregory Lauer, "IN Architechtures for Implementing Universal Personal Telecommunications", IEEE Network Magazine, vol. 8, No. 2, Mar. 1994–Apr. 1994, pp. 6–16.

PORTABILITY OF NON-GEOGRAPHIC TELEPHONE NUMBERS OF INTELLIGENT NETWORK SERVICES

This application is a continuation-in-part of U.S. patent application Ser. No. 08/739,930, filed Oct. 18, 1996, entitled TELECOMMUNICATIONS NETWORK WITH RELOCATEABILITY OF SUBSCRIBER NUMBER, which is commonly assigned and incorporated herein by reference. This application is related to simultaneously filed U.S. patent application Ser. No. 08/764,634, entitled TELECOMMUNICATIONS NETWORK WITH PORTABILITY OF MOBILE SUBSCRIBER NUMBER, which is incorporated herein by reference.

BACKGROUND

1. Field of Invention

This invention pertains to telecommunications systems, and particularly to the routing of calls through a telecommunications system to an intelligent network service having a non-geographical telephone number.

2. Related Art and Other Considerations

A telecommunications network typically includes a number of physical nodes, often referred to as local exchanges, to which subscribers are connected. The local exchanges are generally connected in the telecommunications network by other physical nodes, known as transit exchanges.

To simply the routing of calls through the network and to have a good structure of a telephone numbering plan, each local exchange is allocated one or more unique exchange number groups. The telephone number of a subscriber typically includes both an exchange number group (typically a 10,000 number block) for the exchange to which a subscriber is connected, and a number in that group which is peculiar to the subscriber. For example, a subscriber having a telephone number"881-1657" is connected to a local exchange having an exchange number group "881", and within that group the subscriber has a subscriber number of "1657". The subscriber's telephone number is published or otherwise circulated as his directory telephone number e.g., in a telephone directory or book.

The foregoing is an example of telephone numbers which are geographical, i.e., for which there is a defined relationship between the telephone number and a geographical area served by the exchange to which the subscriber is connected. For other telephone numbers, referred to as "non-geographical telephone numbers", no geographical relationship exist.

Non-geographical telephone numbers include those associated with services such as services provided by intelligent networks, for example toll-free numbers ("800" in the United States), Freephone, Universal Access Numbers, Personal Numbers, Universal Personal Telecommunications (UPT), Virtual Private Networks (VPNs), International Virtual Private Networks (IVPNs), etc. Such intelligent network (IN)-type services are controlled and executed by a service control point (SCP). For each IN service, data used for the SCP's performance of the IN service typically resides in and is retrieved from a service data function (SDF), which can either be collocated with the SCP or remotely located at a service data point (SDP).

With the advent of pro-competitive regulations for the telephone industry, telecommunications subscribers will be entreated to change telephone service providers. In some instances, a change of telephone service providers has traditionally involved a change of directory telephone number for the subscriber, since differing telephone service providers have differing blocks of numbers in a telephone numbering plan. Changing a directory telephone number undesirably occasions expense and effort for the subscriber. For example, the subscriber incurs expense in providing notice of the new directory number to potential callers (friends and business contacts). If such notice is not provided or retained by the potential callers, calls may not be placed to the relocated subscriber. Loss of calls to a ported subscriber can result in loss of social or business opportunity.

For clarity, what is commonly referred to as a telephone service provider, e.g., a telephone company, will hereinafter be referred to as a telephone service operator (TSO). Unless in context of TSO or otherwise stated, the word "service" hereinafter refers to an intelligent network type of service as is offered by a subscriber e.g., to other subscribers.

If subscribers could retain their original telephone numbers, decisions regarding telephone service operator networks could be based on other factors, such as competitive pricing, quality of service, and service features, for example. Providers of IN services having non-geographical telephone numbers could avail themselves of opportunities for changes of telephone service operators if the providers were assured that their original non-geographical telephone numbers could be retained after the change to a new telephone service operator.

Traditional telephone call routing principles pose a problem for retention of telephone numbers upon a change of telephone service operator. In this regard, a common way of routing a call through a telecommunications network to a final destination is to use the directory telephone number of the called party (e.g., the called subscriber), i.e., the "1-800-xxx-nnnn" for a toll free call. In particular, in traditional routing, the called party's directory telephone number occupies an address signal field of an ISUP parameter known as the "Called Party Number" parameter ("CdPN"), with the "Called Party Number" parameter ("CdPN") being a routing or address message utilized for routing purposes.

What is needed therefore, and an object of the present invention, is an efficient way of permitting a provider of a non-geographic telephone number to retain the non-geographic telephone number when the service provider changes telephone service operators.

SUMMARY

A telecommunications network comprises a set of telephone service operator domains, including domains having intelligent network-type services having non-geographic telephone numbers. A call-originating domain accesses a non-geographic service number database to obtain address information concerning the domain which currently handles the called service. The address information obtained from the non-geographic service number database includes the address of a node in the domain which handles the service, e.g., a gateway node (GW), and optionally the addresses of a service switching point (SSP), a service control function (SCF), and a service data function (SDF) which handles the called service. When changing telephone service operators (e.g., changing to a new domain), the non-geographic service number database is updated to reflect the change. Access of the database and usage of the addresses obtained therefrom in the routing message permit the service to retain the same directory number when changing telephone service operators.

Some embodiments particularly show routing e.g., to a service control function (SCF) of the telephone service operator network of the recipient IN service from a service switching function (SSF) of the same telephone service operator network. Other embodiments, by contrast, show e.g., examples of routing to a service control function (SCF) of the telephone service operator network of the recipient IN service from a signal switching function outside of the telephone service operator network of the recipient service (e.g., from the caller's telephone service operator network). In conjunction with such routing, a database outside of the telephone service operator network of the recipient service is queried to obtain address information, including the address of the SSP to be utilized in the outside network and the address of the SCF which handles the service. The database can be consulted at various by various nodes, including a local exchange node, a transit node, or a SSP, for example.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
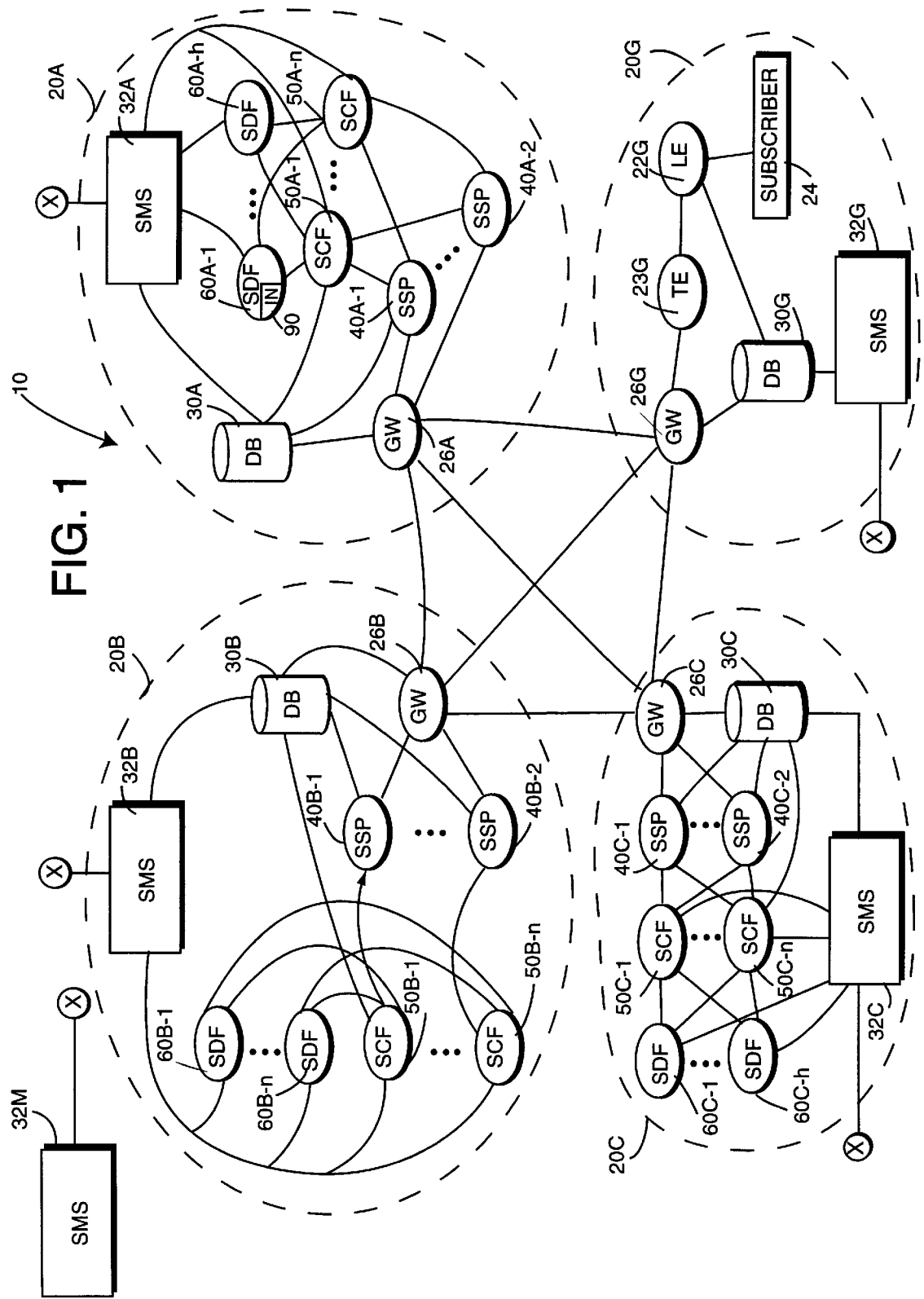
FIG. 1 is a schematic view of a telecommunications system according to a first embodiment of the present invention.

FIG. 1 shows a telecommunications system or network 10 according to an embodiment of the invention. Network 10 includes a set of telephone service operator domains 20A–20C and 20G. Three of the domains (particularly domains 20A–20C) cater to subscribers which provide intelligent network-type services having non-geographic telephone numbers; domain 20G serves subscribers with geographical telephone numbers. In the illustrated embodiment, domain 20G can be of a network type such as a public switched telephone network (PSTN) or integrated services digital network (ISDN), for example. In one mode of the invention, some of the domains 20 are served by differing telephone service operators, e.g., different telecommunications operating companies.

Geographical domain 20G includes at least one local exchange 22G. Local exchange 22G is connected to a plurality of fixed subscriber stations, only one of which (subscriber 24) is shown in FIG. 1. Local exchange 22G is connected via transit exchange 23G to a gateway exchange or gateway node 26G. Gateway node 26G is connected to a database 30G. Database 30G is, in turn, connected (e.g., for updating and maintenance purposes) to an operator management system (SMS) 32G.

Domains 20A–20C each have respective gateway nodes 26A–26C. Each gateway node 26A–26C and 26G is connected to a gateway node of at least one other domain, all gateways nodes being interconnected in the example shown in FIG. 1.

Each gateway node 26 serves as an interface to external domains 20 for one or more service switching points (SSPs) 40 which belong to the domain. Each SSP 40 is a node which can communicate with service control functions (SCFs) 50, hereinafter described, by means of TCAP and SCCP protocols (hereinafter described). Although each of domains 20A–20C have a plurality of SSPs, for each domain only two such SSPs are labeled. For example, domain 20A has SSPs 40A-1 and 40A-2; domain 20B has SSPs 40B-1 and 40B-2, and so forth. Each gateway node 26 is connected to the SSPs 40 in its domain.

Domains 20A–20C include both service control functions (SCFs) 50 and Service Data Functions (SDFs) 60. The SCFs 50 control processing of e.g., intelligent network (IN) services and custom service requests. When implemented in a standalone physical mode, an SCF is called a sence control port (SCP) The SDFs 60 are service data functions in which data for an IN-type service is stored and from which the IN service data is retrieved and used by the SCP for performance of the IN service. Although not specifically shown in the drawings, an SDF can be collocated with the SCF at an SCP or can be remote from the SCP. A remotely located standalone SDF resides at a service data point (SDP). Usage of SDF herein is intended to cover both cases of the IN service data being located at the SCP or at an SDP.

Domains 20A–20C have a plurality (n number) of SCFs 50 and a plurality (k number) of SDFs 60, i.e., SCFs 50A-1 through 50A-n and SDFs 60A-1 through 60A-k (k usually being less than n). SCFs 50 of a domain 20 are connected to each of the SSPs 40 and SDFs 60 of that domain (although this need not necessarily always be the case). In addition, at least one of the SCFs 50 of a domain 20 is connected to database 30 for that domain. Each SDF 60 of a domain is connected to the operator management system 32 of the domain. Although all domains herein are illustrated as having the same number of constituent elements, e.g., n number of SCFs and k number of SDFs, the number of such elements per domain typically varies.

Each of domains 20A–20C further includes respective databases 30A–30C. In each domain 20, database 30 is connected to gateway node 26 and (depending on how much information is received at gateway node 26) to one of the SSPs 40 and to one of the SCFs 50.

Databases 30A–30C are also connected to and maintained by operator management systems (SMS) 32A–32C, respectively. In each of domains 20A–20C, operator management systems 32A–32C are connected to each of the SDFs 60. Operator management systems 32–32C of domains 20A–20C respectively are also connected to and supervised by a master operator management system 32M.

Databases 30 are subscriber location servers which are augmented with additional intelligence and accordingly are known and denominated (e.g., in U.S. patent application Ser. No. 08/733,930, filed Oct. 18, 1996, incorporated herein by reference) as a network number and address portability servers (NAPS). Databases 30 include information which facilitates number portability for many types of subscribers in their respective domains, including subscribers which offer intelligent network-type services which have non-geographical telephone numbers. Without overlooking the broader use of the databases 30, for convenience herein, the databases 30 will sometimes be referred to as non-geographical service number databases 30 to emphasize the aspects thereof pertinent to the present invention.

As will become more apparent below, the domains 20A–20C comprise an operator changeability domain for non-geographic service numbers. In the operator changeability domain, a subscriber with a non-geographical telephone number can change telephone service operators, e.g., change from one of the domains to another, e.g., change from domain 20A to domain 20C, and still maintain the same "directory" number for the intelligent network-type of service provided by the subscriber.

Although domains 20A–20C show primarily equipment useful for supporting non-geographic intelligent network-type services for the sake of illustrating the present invention, it should be understood that domains 20A–20C are not so limited and that varieties of other types of telephone services can also be provided.

Communications and signaling occurs between domains 20 of FIG. 1 and their components. Telecommunications models have been created for standardized descriptions of different cases of information transfer in networks such as network 10 of FIG. 1. One such model is the Open System Interconnection (OSI) model, which is structured in well-defined and specified layers which are each completely independent of the others. Like the OSI model, the CCITT Signaling System No. 7 is also structured in layers. The first such layer is the physical level, which is the interface to the information bearer, the signaling network. The first layer converts the zeros and ones of a frame into pulses of the right size and shape and transmits them over a line. The second layer concerns fault handling, and has functions for separating messages, fault detection and correction, detection of signaling link faults, etc. The third layer concerns addressing and message handling (e.g., distribution and routing), and contains functions for ensuring that the message gets to the correct exchange, and functions for checking the network and maintaining transmission capabilities. The fourth layer is the user part, and is designed so that several different users can use the same signaling network.

Figure 11:
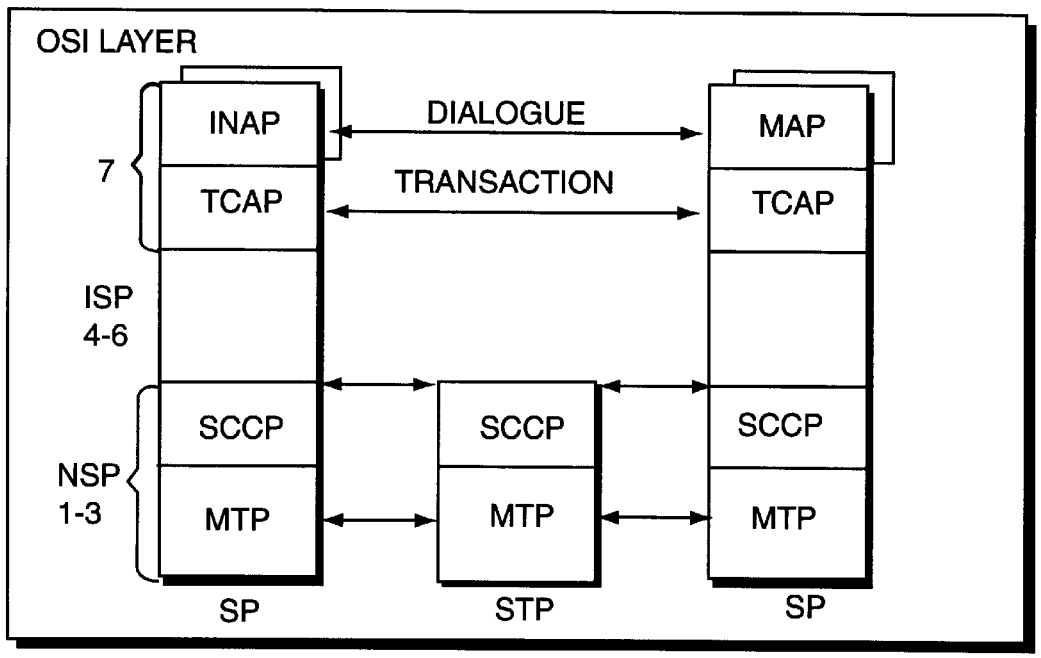
FIG. 11 is a schematic view of layers of information transfer in accordance with an Open System Interconnection (OSI) model.

CCITT Signaling System No. 7 includes a number of functional parts, including a Message Transfer Part (MTP) and a number of different user parts. As shown in FIG. 11, the Message Transfer Part (MTP) resides in the first three layers. The Message Transfer Part (MTP) serves as a common transport system for reliable transfer of signaling messages between signaling points and is independent of the content of each User Part message. Thus, the responsibility of the MTP is to convey signaling messages from one User Part to another User Part in a reliable way. Each user part contains the functions and procedures which are particular to a certain type of user of the signaling system. Examples of user parts are the Telephone User Part (TUP), the Data User Part (DUP), the ISDN User Part (ISUP), and the Mobile Telephone User Part (MTUP).

In the OSI layer organization, CCITT 1984 introduced a Signaling Connection Control Part (SCCP) which provides additional functions to the Message Transfer Part (MTP) and which is situated above MTP in the OSI layering scheme [see FIG. 11]. The combination of MTP and SCCP is called the Network Service Part (NSP). The Network Service Part (NSP) meets the requirements for Layer 3 services as defined in the OSI Reference Model, CCITT Recommendation X.200. The SCCP is described in CCITT Recommendation Q.711Q.716. The SCCP makes it possible to transfer both circuit related and non-circuit related signaling and user information between exchanges and specialized centers in telecommunications networks via a CCITT No. 7 network.

Layers 4–6 of the OSI model of FIG. 11 include the Intermediate Service Part (ISP). The Intermediate Service Part (ISP) is an element of the transaction capabilities which supports the Transaction Capabilities Application Part (TCAP) for connection-oriented messages. The Transaction Capabilities Application Part (TCAP) resides in layer 7 of the OSI model. Also provided in layer 7, residing above the Transaction Capabilities Application Part (TCAP), is the Intelligent Network Application Protocol (INAP).

Figure 2:
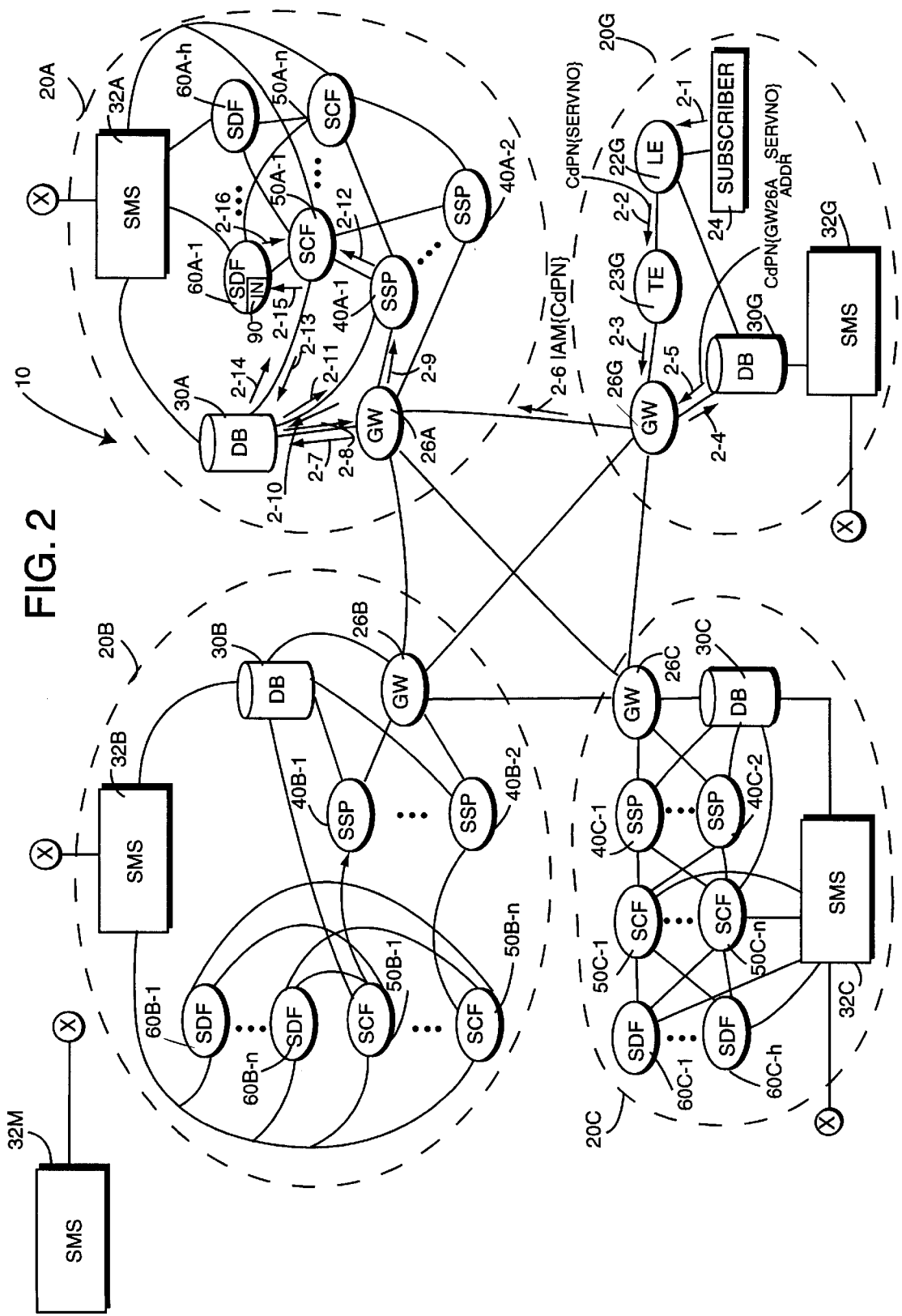
FIG. 2 is a schematic view of the telecommunications system of FIG. 1 and showing actions taken to call a service in accordance with a first mode of the invention.

FIG. 2 illustrates actions involved when subscriber 24 in geographical domain 20G places a call to a non-geographical telephone number for an intelligent network-type (IN) service. In the particular example of FIG. 2, the call is placed to an IN service which is performed by SCF 50A-1 using data stored in SDF 60A-1 of domain 20A. In view of the called service's data being stored in SDF 60A-1, for simplification the service is depicted by reference numeral 90 as residing in SDF 60A-1 (although SCF 50A-1 actually performs the service).

Action 2-1 shows subscriber 24 dialing the directory number ("Servno") of the non-geographical IN service and the dialed directory number being routed to local exchange 22G. Action 2—2 shows local exchange 22G sending a routing message to transit exchange 23G. In action 2—2, the directory number ("Servno") of the non-geographical service 90 is included in an address signal field of a routing message such as an ISUP called party parameter (CdPN). The routing message is, in turn, relayed by transit exchange 23G to gateway node 26G as indicated by action 2–3. In FIG. 2, the expression CdPN{Servno} is meant to indicate that the CdPN parameter includes, in its address signal field, the directory number (Servno) dialed by subscriber 24 in an effort to reach service 90.

Figure 12:
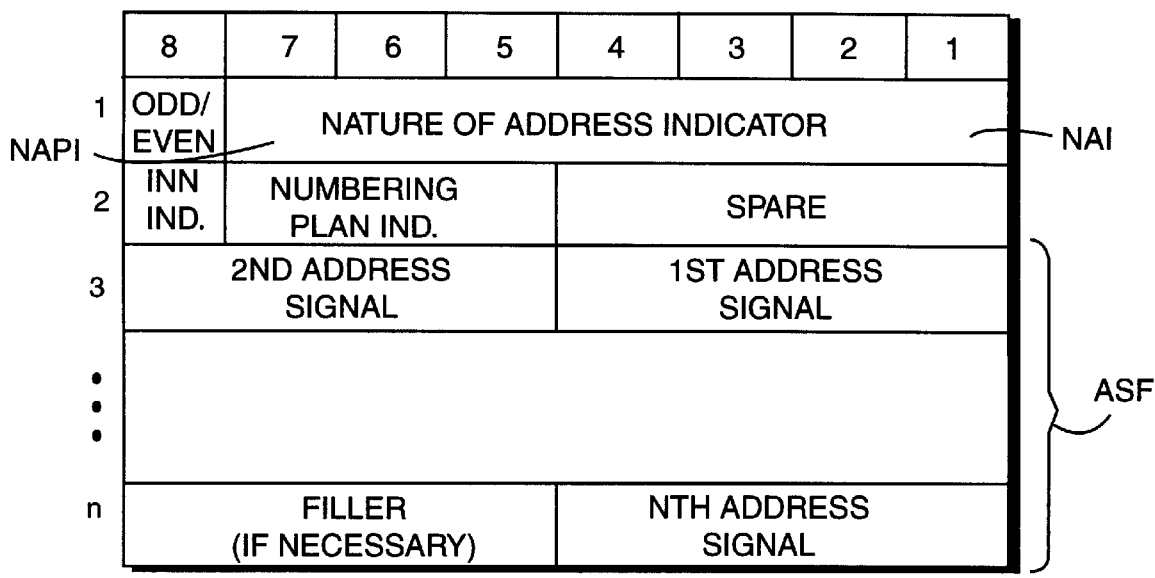
FIG. 12 is a schematic view of a format of an industry standard called party number parameter.

FIG. 12 shows the format of a called party parameter (CdPN) of the ITU-T Rec. Q.763 standard, an industry standard. The called party parameter (CdPN) is utilized to route calls between exchanges of a telecommunications system. The CdPN format of FIG. 12 includes a seven bit Nature of Address Indicator ("NAI") in its first byte; a Number Plan Indicator ("NAPI") in bits 5–7 of its second byte; and an Address Signal Field ("ASF") in its last n-3 bytes. The Number Plan Indicator ("NAPI") is a field that has one of 8 different values, and which indicates to what type of plan the called subscriber subscribes (e.g., ISDN or not). The Nature of Address Indicator ("NAI") is an ISUP parameter having one of 128 values, many of which are spare (i.e., not yet assigned). The NAI is conventionally employed to indicate such things as whether the number is a national number, and international number, etc. The Address Signal Field ("ASF") has n-2 number of four bit nibbles, each nibble representing an address signal. The most significant address signal is sent first, subsequent address signals are sent in successive 4-bit nibbles.

Gateway node 26G receives the routing message from transit exchange 23G and, as indicated by action 2-4, sends a query with CdPN{Servno} to non-geographical service number database 30G. In the mode shown in FIG. 2, non-geographical service number database 30G uses the Servno value in the CdPN parameter to determine that the dialed service 90 is currently served by gateway node 26A. Then, at action 2-5, non-geographical service number database 30F returns to gateway node 26G a CdPN parameter that now includes both the address of gateway node 26A ($GW26_{AADDR}$) and the Servno of the called non-geographical service 90, i.e., CdPN {$GW26_{AADDR}$, Servno}.

At action 2-6 gateway node 26G formulates and sends to gateway 26A an initial routing message (IAM) which includes the CdPN parameter having the values returned by non-geographical service number database 30G, particularly $GW26A_{ADDR}$ and Servno. Then, at action 2-7, gateway 26A uses the Servno value to query database 30A to determine which of the SSPs in the domain, i.e., SSPs 40A-1, 40A-2, is to be utilized to reach service 90. Action 2-8 shows database 30A returning to gateway 26A an address for the appropriate SSP, for example the address of SSP 40A-1.

In action 2–9, the call is routed to the appropriate SSP whose address was returned from database 30A in action 2-8.

At action 2-10 SSP 40A-1 queries database 30A to obtain a "Global Title" to be used for communicating to the SCF which supports service 90. The Global Title or "GT" is an address in the SCCP part (see FIG. 11). Action 2-11 shows the Global Title being returned by database 30A to SSP 40A-1, in particular a Global Title indicative of SCF 50A-1 for the present example involving service 90. Action 2-12 then shows the InitialDP being sent to SCF 50A-1. The InitialDP is a query on ITU-T & ETSI standardized INAP protocol versions 1 & 2, and is the first operation sent from a service switching point to a service control point when an intelligence ("IN") trigger is detected in the service switching point.

At action 2-13, SCF 50A-1 queries database 30A to get the Global Title to the service data point (SDP) corresponding to the service data point at which resides the service data function (SDF) which holds the data for service 90. The Global Title to SDF 60A-1 is returned to SCF 50A-1 in action 2-14. Knowing the Global Title of SDF 60A-1, at action 2-15 SCF 50A-1 fetches the data pertaining to service 90 which is stored at SDF 60A-1. The data pertaining to service 90 which is stored at SDF 60A-1 is returned to SCF 50A-1 by action 2-16. SCF 50A-1 then uses that data to route the call to the equipment which provides service 90.

Figure 3:
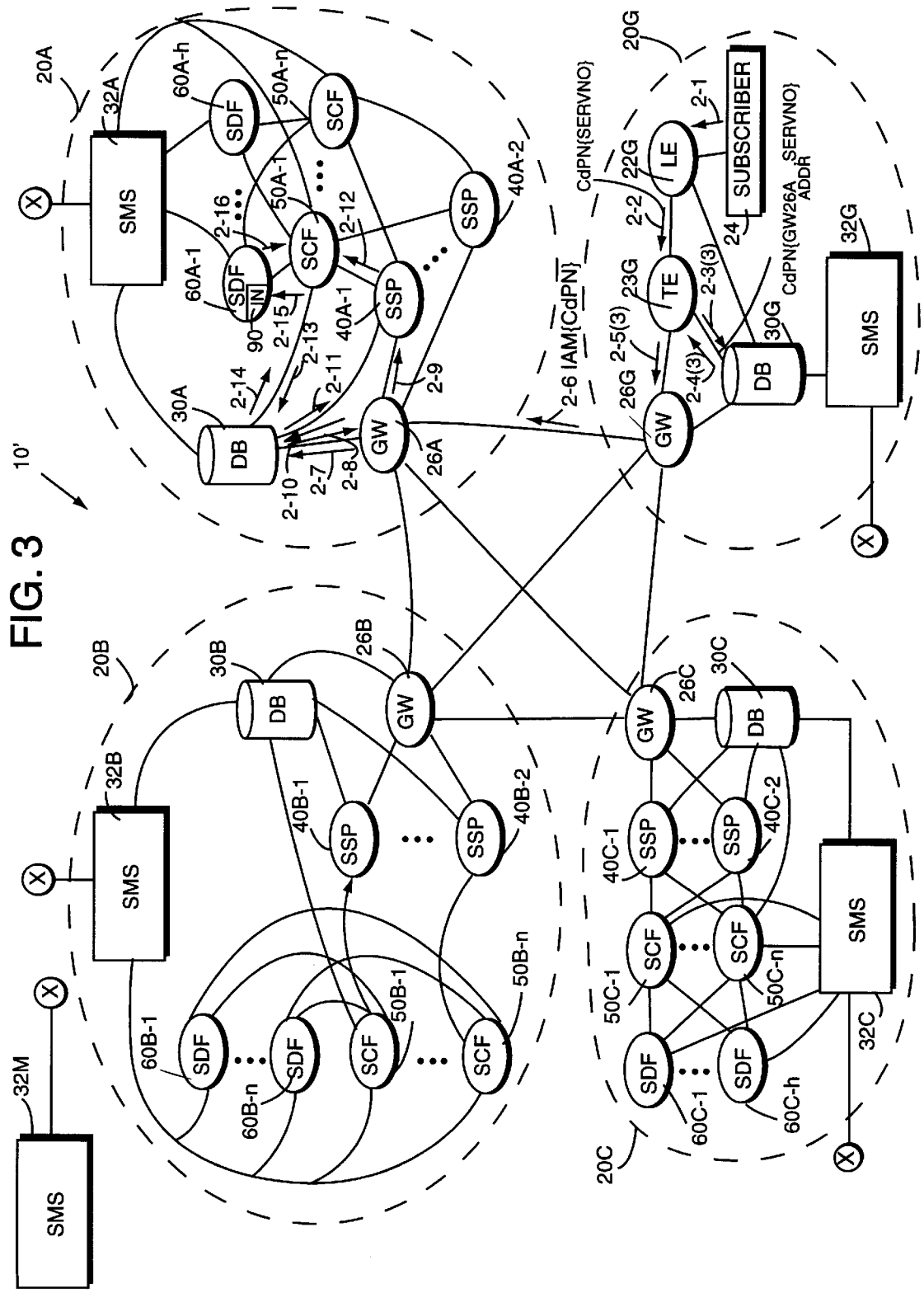
FIG. 3 is a schematic view of a telecommunications system according to another embodiment of the present invention.

FIG. 3 shows telecommunications system or network 10' according to another embodiment of the invention. Network 10' of FIG. 3 differs from network 10 of FIG. 1 only in that, in domain 20G, transit exchange 23G is connected to and has access to database 30G. In view of such connection, after action 2—2 transit exchange 23G queries database 30G as indicated by action 2-3(3). At action 2-4(3), database 30G returns to transit exchange 23G a CdPN parameter that includes both the address of gateway node 26A ($GW26A_{ADDR}$) and the Servno of the called non-geographical service 90, i.e., CdPN{$GW26A_{ADDR}$, Servno}. This CdPN parameter is then relayed to gateway node 26G by action 2-5(3). Thereafter, the call is routed to domain 20A and the actions in domain 20A above described with respect to FIG. 2 occur so that the data for service 90 can be obtained from SDF 60A-1.

Figure 4:
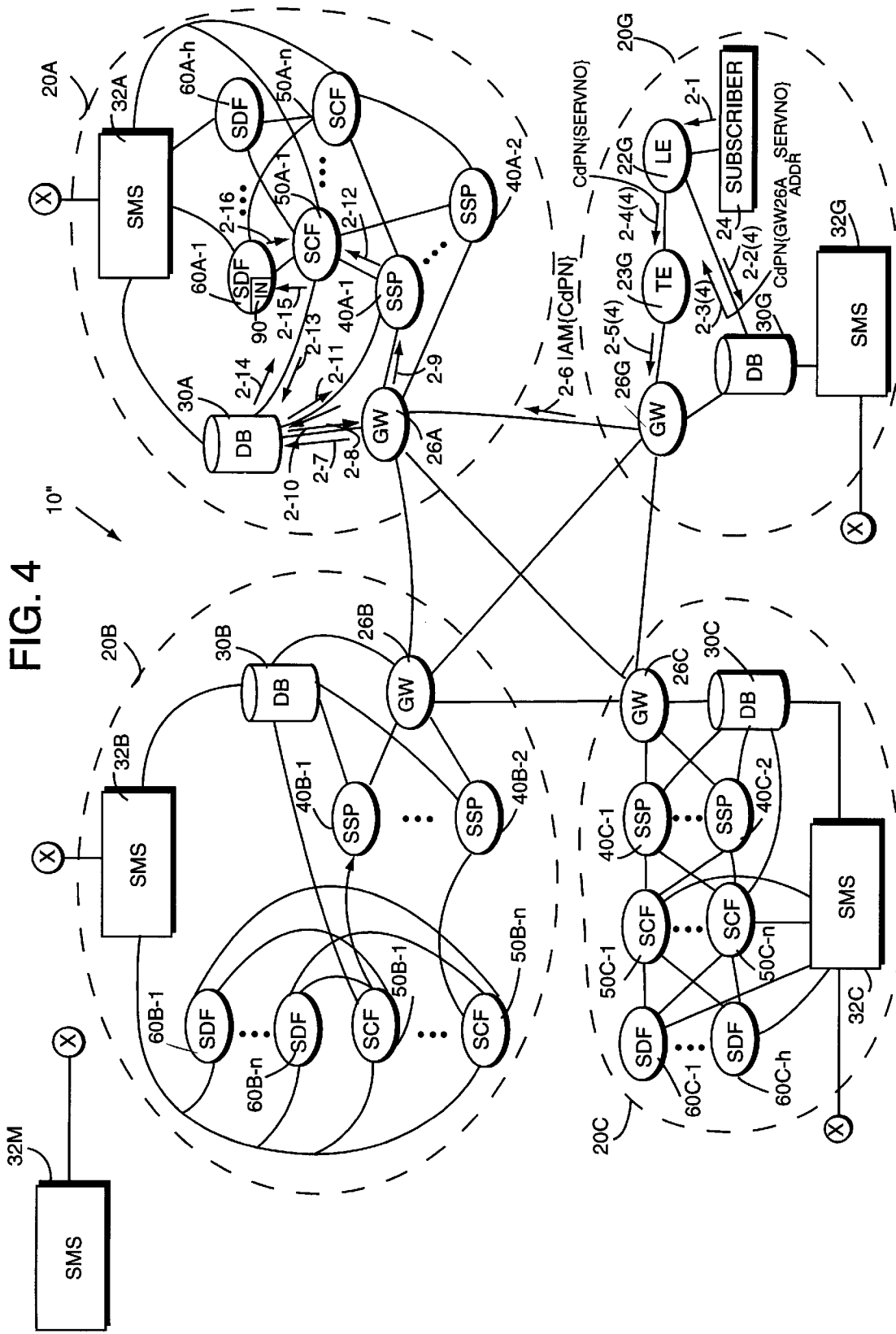
FIG. 4 is a schematic view of a telecommunications system according to yet another embodiment of the present invention.

FIG. 4 shows telecommunications system or network 10" according to yet another embodiment of the invention. Network 10' of FIG. 4 differs from network 10 of FIG. 1 only in that, in domain 20G, local exchange 22G is connected to and has access to database 30G. In view of such connection, after action 2–1 local exchange 22G queries database 30G as indicated by action 2—2(4). At action 2-3(4), database 30G returns to local exchange 23G a CdPN parameter that includes both the address of gateway node 26A ($GW26A_{ADDR}$) and the Servno of the called non-geographical service 90, i.e., CdPN{$GW26A_{ADDR}$, Servno}. This CdPN parameter is then relayed to transit exchange 23G at action 2-4(4), and then relayed to gateway node 26G by action 2-5(4). Thereafter, the call is routed to domain 20A and the actions in domain 20A above described with respect to FIG. 2 occur so that the data for service 90 can be obtained from SDF 60A-1.

Figure 5:
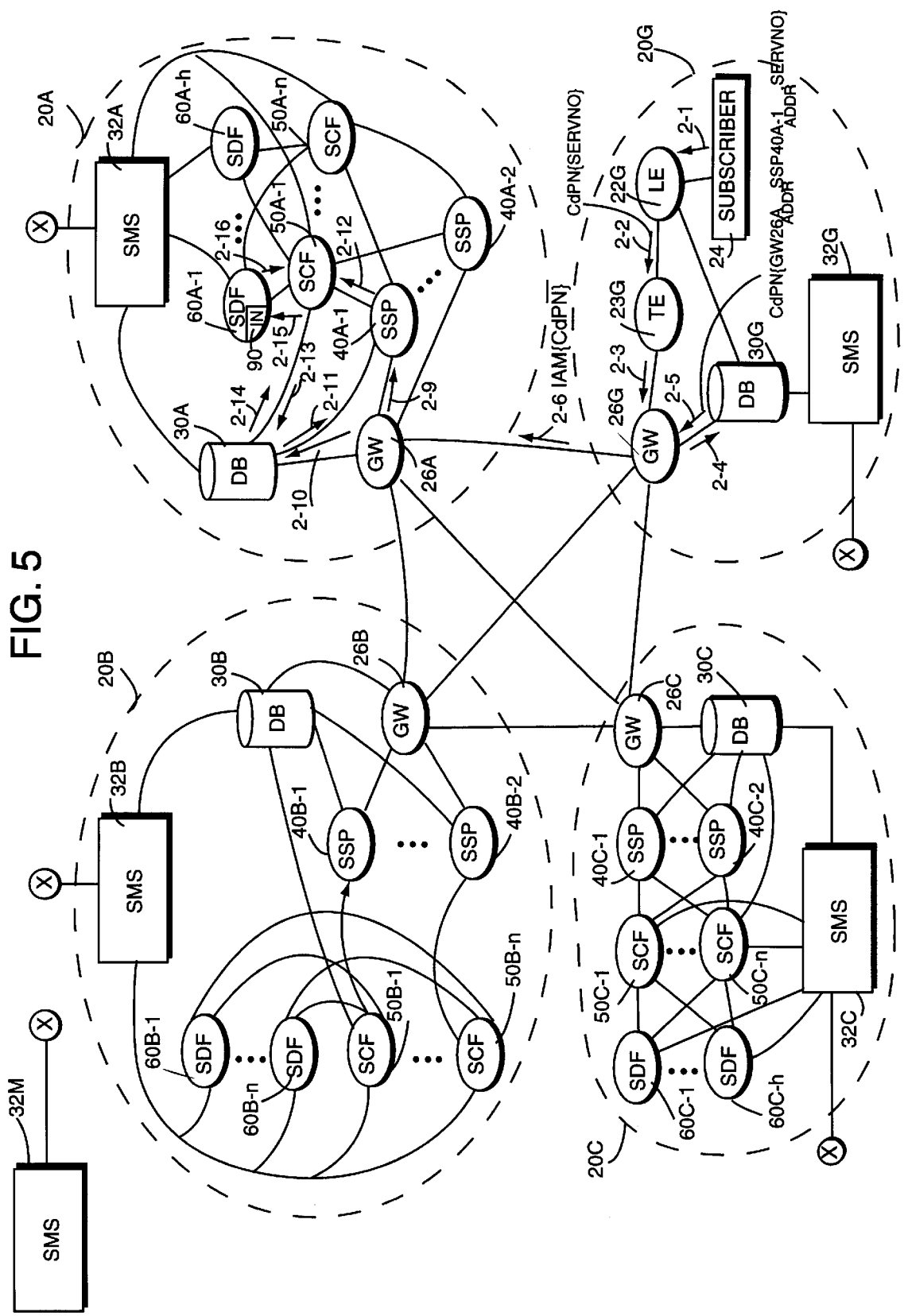
FIG. 5 is a schematic view of the telecommunications system of FIG. 1 and showing actions taken to call a service in accordance with another mode of the invention.

FIG. 5 shows another mode of the invention in which database 30G returns not only the address for the gateway node for the domain to which service 90 subscribes, but also the address for the SSP which handles service 90. Specifically, when database 30G is queried at action 2-4 with the Servno of service 90, database returns as action 2-5 to gateway node 26G a CdPN parameter that now includes the address of gateway node 26A ($GW26A_{ADDR}$), the address of SSP 40A-1 ($SSP40A-1_{ADDR}$), and the Servno of the called non-geographical service 90, i.e., CdPN{$GW26A_{ADDR}$, SSP40A-1$_{ADDR}$, Servno}. When the IAM is sent at action 2-6 to gateway node 26A, gateway node 26A knows the address of the SSP (i.e., SSP 40A-1) which handles the service being called, so that action 2-9 follows. Actions 2-7 and 2-8 shown in FIG. 2 are obviated by the CdPN parameter including the address of the SSP which handles the service being called. Actions 2-9 and following in the mode of FIG. 5 are identical to those described with reference to FIG. 2.

Figure 6:
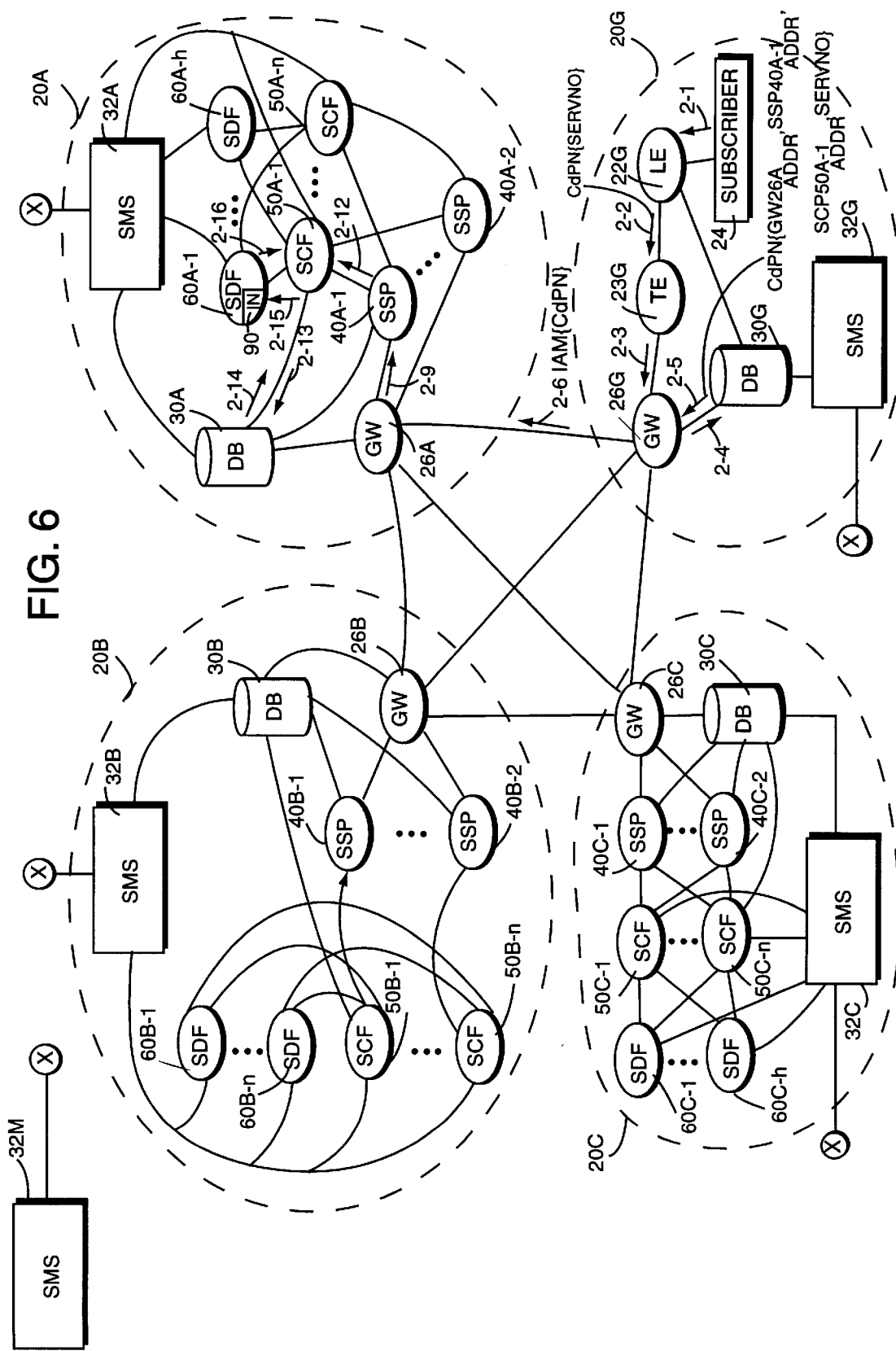
FIG. 6 is a schematic view of the telecommunications system of FIG. 1 and showing actions taken to call a service in accordance with yet another mode of the invention.

FIG. 6 shows yet another mode of the invention in which database 30G returns not only the information returned in the mode of FIG. 5, but additionally the address for the SCF which handles service 90. The CdPN parameter returned by action 2-5 of FIG. 6 includes the address of gateway node 26A (GW26A$_{ADDR}$), the address of SSP 40A-1 (SSP40A-1$_{ADDR}$), the address of SCF 50A-1 (SCF50A-1$_{ADDR}$), and Servno, i.e., CdPN{GW26A$_{ADDR}$, SSP40A-1$_{ADDR}$, SSP40A-1$_{ADDR}$, Servno}. Such being the case, SSP 40A-1 obtains the Global Title for SCF 50A-1 from the CdPN parameter, so that (in addition to actions 2-7 and 2-8) actions 2-10 and 2-11 are not performed in the mode of FIG. 6.

Figure 7:
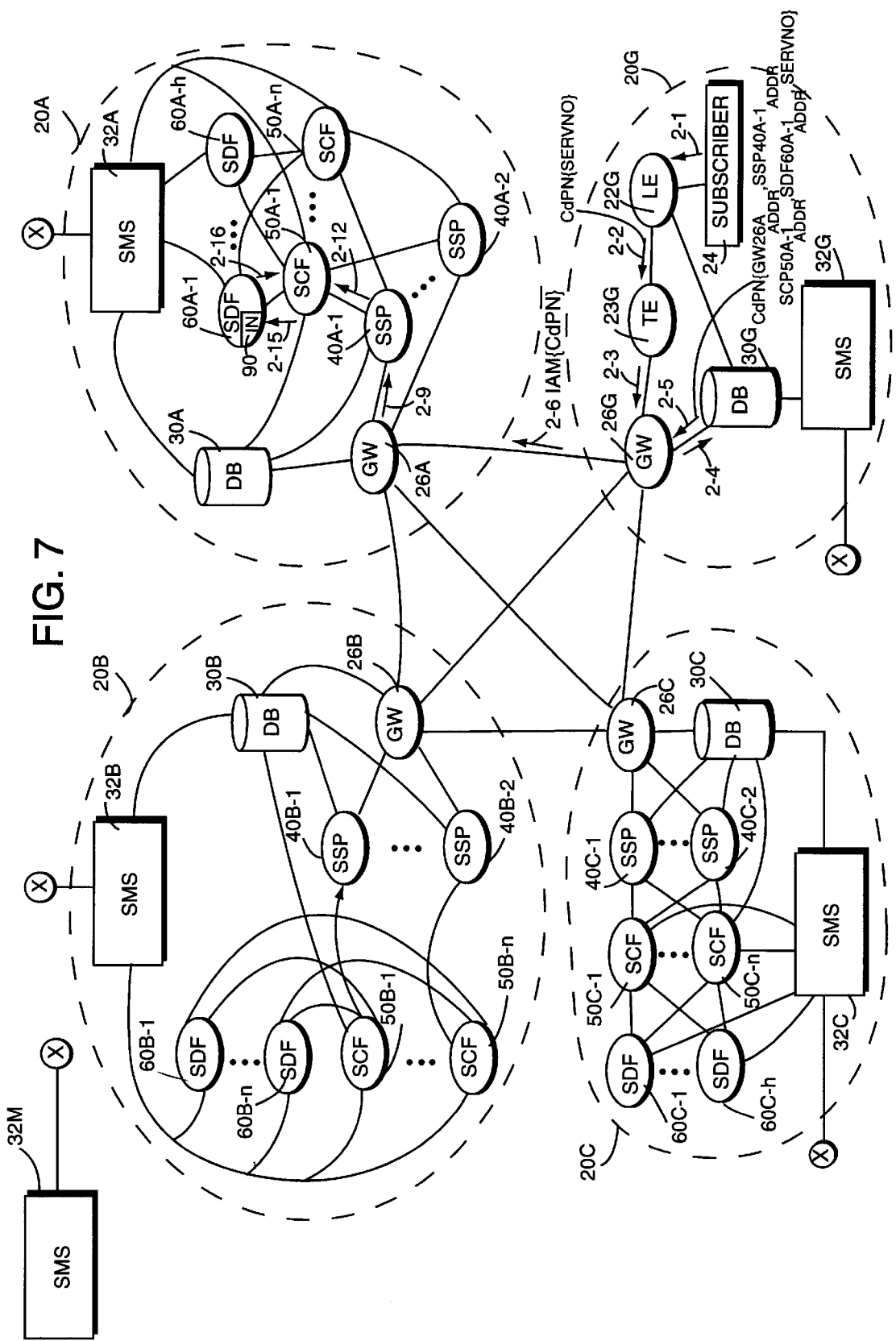
FIG. 7 is a schematic view of the telecommunications system of FIG. 1 and showing actions taken to call a service in accordance with still another mode of the invention.

FIG. 7 shows still another mode of the invention in which database 30G returns not only the information returned in the mode of FIG. 6, but additionally the address for the SDF which handles service 90. The CdPN parameter returned by action 2-5 of FIG. 7 includes the address of gateway node 26A (GW26A$_{ADDR}$), the address of SSP 40A-1 (SSP40A-1$_{ADDR}$), the address of SCF 50A-1 (SCF50A-1$_{ADDR}$), the address of SDF 60A-1 (SDF60A-1$_{ADDR}$), and Servno, i.e., CdPN{GW26A$_{ADDR}$, SSP40A-1$_{ADDR}$, SSP40A-1$_{ADDR}$, SDF60A-1$_{ADDR}$, Servno}. Such being the case, SCF 50A-1 obtains the Global Title for SDF 60A-1 from the CdPN parameter, so that (in addition to the actions obviated in the mode of FIG. 6) actions 2-13 and 2-14 are not performed in the mode of FIG. 7.

It should be understood that the modes above discussed with respect to FIG. 5, FIG. 6, and FIG. 7 are applicable to the each of network 10' of FIG. 3 and network 10" of FIG. 4, as well as to network 10 of FIG. 1. That is, in each of the modes of FIG. 5, FIG. 6, and FIG. 7, database 30G can be queried either by gateway node 26G, transit exchange 23G, or local exchange 22G.

Figure 8:
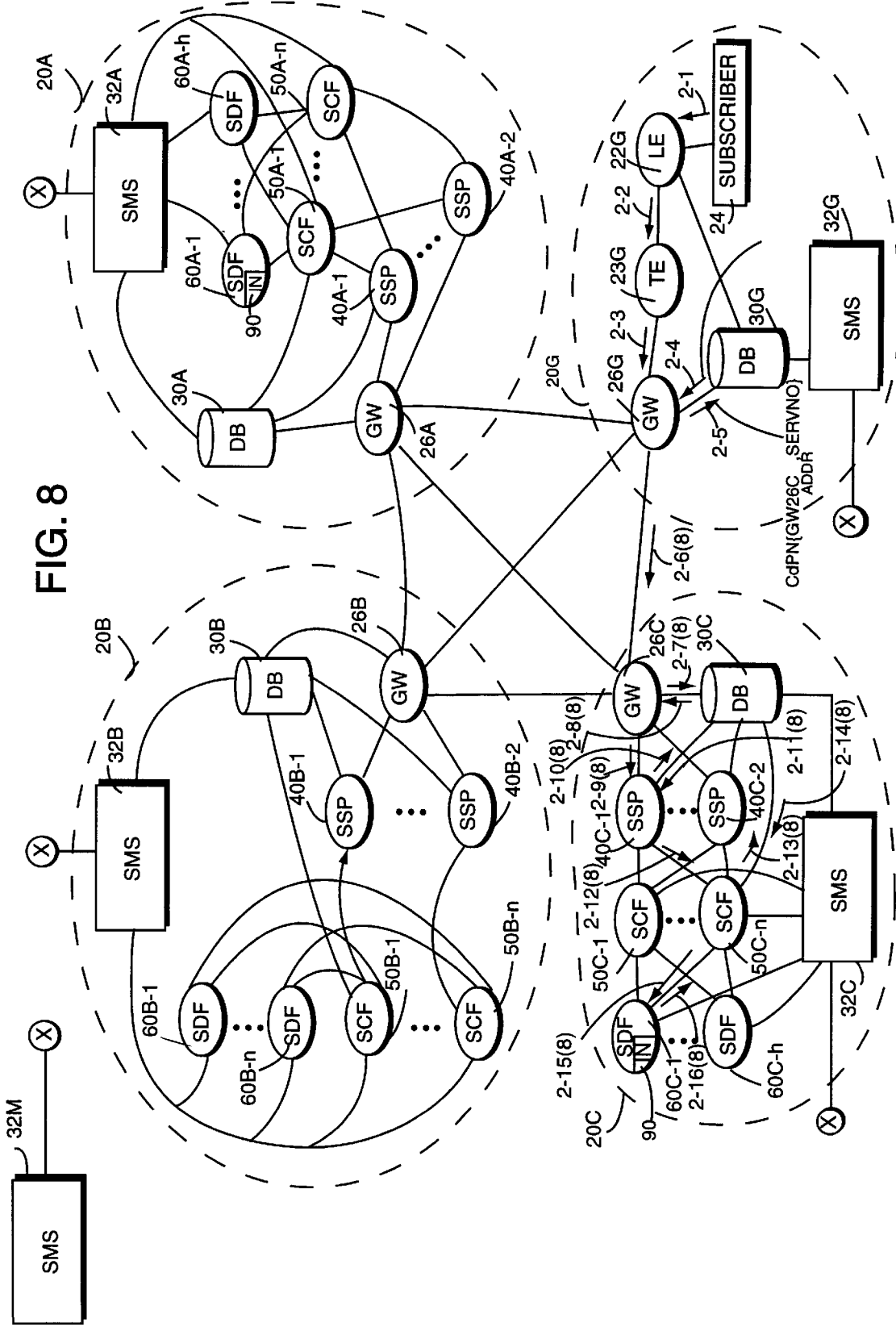
FIG. 8 is a schematic view of the telecommunications system of FIG. 1 but showing that a service has changed subscription from a first telephone service operator to a second telephone service operator.

FIG. 8 illustrates routing of a call to service 90 after the subscriber which offers service 90 has changed telephone service operators, e.g., the service is ported from domain 20A to domain 20C. In particular, as shown in FIG. 8, data for service 90 is now stored at SDF 60C-1. However, service 90 still has the same directory number Servno as formerly when in domain 20A.

Upon the change of subscription depicted by FIG. 8, deletion of the service 90 from domain 20A was communicated to all databases 30 for database updating. In one mode of database updating, the deletion of the service from domain 20A was communicated to operator management system (SMS) 32A, which advised master service management system (SMS) 32M. SMS 32M subsequently communicated the deletion of the service to all SMSs 32, including SMSs 32B, 32C, and 32G, which in turn updated respective databases 30B, 30C, and 30F, accordingly. Then, when the service joined the domain 20C, SMS 32C advised master SMS 32M of the enlistment. SMS 32M subsequently advised all SMS 32 of the enlistment in domain 20C of service 90, including SMSs 32A, 32B, and 32G, which in turn updated respective databases 30A, 30B, and 32G, accordingly. In another mode, SMS 32M may initially be apprised of deletion of the IN service from domain 20A and porting of the IN service to domain 20C, and thereupon advise all other operator management systems (SMS) 32 so that the databases 30 can be updated.

Actions 2-1 through 2-4 of FIG. 8 are the same as for FIG. 2, including the dialing in action 2-1 of the same directory number Servno as formerly when in domain 20A. However, in view of the porting of service 90 to domain 20C, in action 2-5 the CdPN parameter returned by database 30G includes the address of gateway node 26C (GW26C$_{ADDR}$) of service 90's new domain 20C rather than the address of gateway node 26A of old domain 20A, i.e., CdPN{GW26C$_{ADDR}$, Servno}.

The subsequent actions 2-6(8) through 2-6(16) of FIG. 8 are understood with respect to correspondingly numbered actions 2-6 through 2-6 of FIG. 2. Ultimately the call is routed through gateway 26C, SSP 40C-1, SCF 50C-n, and SDF 60C-1 to obtain data for service 90 for completing the call.

It is understood, of course, that the modes of FIG. 5, FIG. 6, or FIG. 7 can be implemented for completing the call to service 90 relocated to domain 20C in the manner above-discussed with reference to FIG. 8.

The foregoing exemplary embodiments of the invention particularly show routing e.g., to a service control function (SCF) of the telephone service operator network of the recipient IN service from a service switching function (SSF) of the same telephone service operator network. The following embodiments, by contrast, show e.g., examples of routing to a service control function (SCF) of the telephone service operator network of the recipient IN service from a service switching function outside of the telephone service operator network of the recipient service (e.g., from the caller's telephone service operator network).

Figure 9:
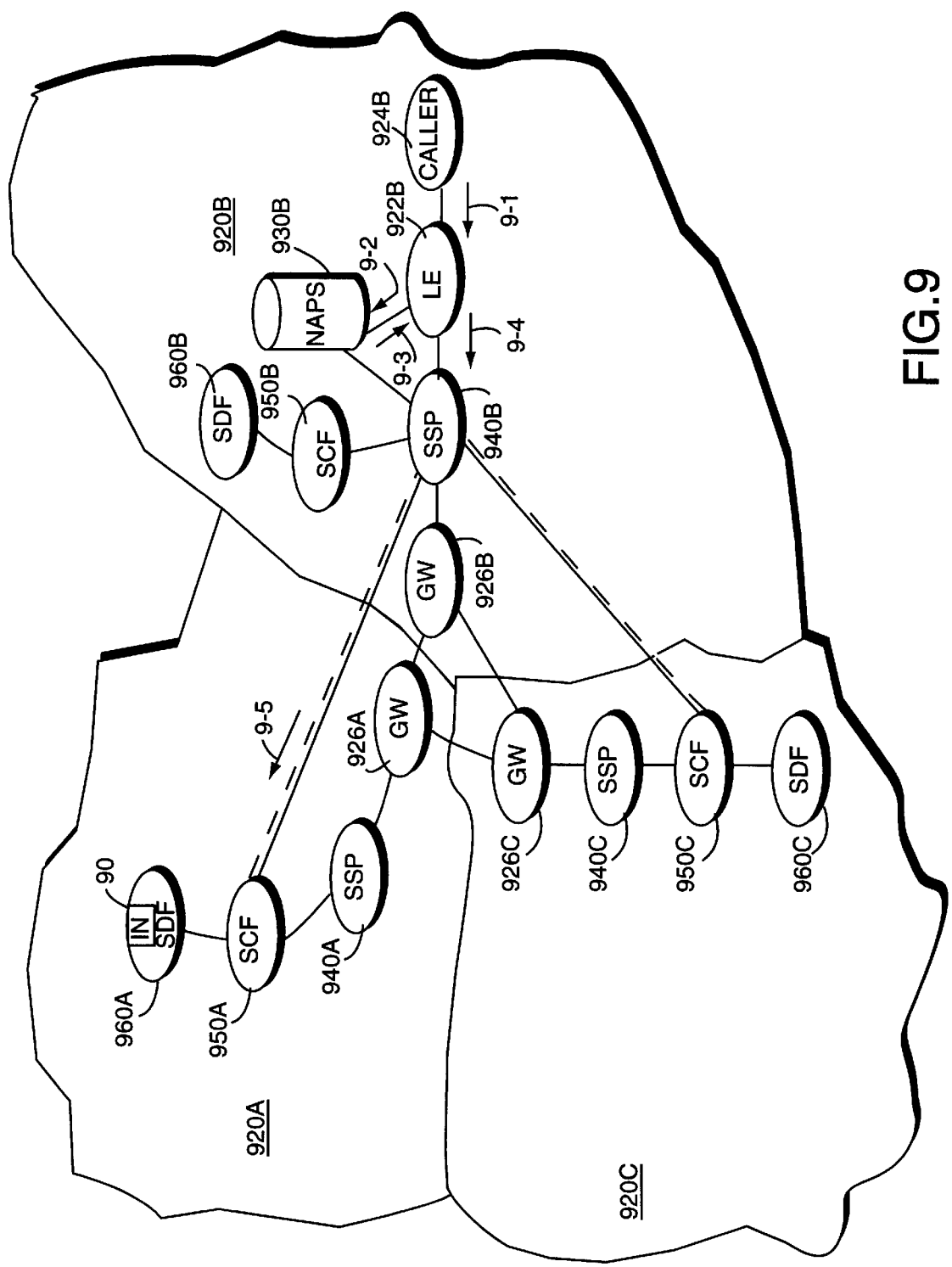
FIG. 9 is a schematic view of a telecommunications system having routing to a service control function (SCF) of the telephone service operator network of the recipient IN service from a signal switching function outside of the telephone service operator network of the recipient service, with a local exchange querying a database to obtain routing information.

FIG. 9 shows three telephone service operator networks or domains 920A–920C. Each domain has a gateway node 926 which is connected to a service switching point (SSP) 940. The SSP 940 of each domain 920 is connected to a service control function (SCF) 950, which in turn is connected to a service data function (SDF) 960. Gateway nodes of the various domains are connected together, e.g., gateway node 926B is connected to both gateway nodes 926A and 926C.

Domain 920B further shows that a local exchange 922B is connected to SSP 940B, and that a subscriber or caller 924B is connected to local exchange 922B. Domain 920B further includes a database or NAPs 930B, which is illustrated as being connected to SSP 940B and to local exchange 922B. In addition, SSP 940B of domain 920B is shown as having a signaling connection to SCF 950A of domain 920A and to SCF 950C of domain 920C.

The domains 920A–920C of FIG. 9 are shown in simplified form. It should be appreciated that as illustrated the domains include only elements necessary for illustrating the present invention, but that in reality these domains include further elements such as, for examples, local exchanges, further SSPs 940, further SCFs 950, further SDFs 960. Similarly, it should be understood that domains 920A and 920C may have their own NAPs 930, in which case all NAPs 930 would be connected to an unillustrated master or supervisory NAPs. Likewise, domains 920A and 920C may have their SSPs connected to SCFs of other domains in the manner depicted for SSP 940B of domain 940B. Moreover, it should be understood that the SDFs 960 in FIG. 9 may be collocated with SCFs 950 or alternatively may be remotely located at SDPS.

FIG. 9 also shows actions performed when caller 924B dials the directory number (Servno) of an intelligent network-type (IN) service which resides in domain 920A (i.e., an IN service which is performed by SCF 950A and for which data is stored at SDF 960A). Action 9-1 shows the service numbers being dialed and forwarded to local exchange 922B. Action 9-2 shows local exchange 922B using the Servno to make an inquiry of database 930B regarding routing to the dialed IN service.

At action 9-3, database 930B returns a routing number, e.g., an address as to which SSP and which SCF to invoke, for inclusion in a routing message such as e.g., a called party number parameter (CdPN). In the illustrated example, database 930B returns at action 9-3 the address of SSP 940B and the address of SCF 950A, since SCF 950A performs the IN service dialed by caller 924B. Action 9-4 shows the routing message, e.g, CdPN, being forwarded to SSP 940B.

SSP 940B uses the address of SCF 950A obtained from the routing message as Global Title (GT) when routing in the CCITT Signal No. 7 network to SCF 950A, as shown by action 9-5. With the call properly routed, SCF 950A, using data obtained from SDF 960A, performs the IN service requested by caller 924B.

Figure 9A:
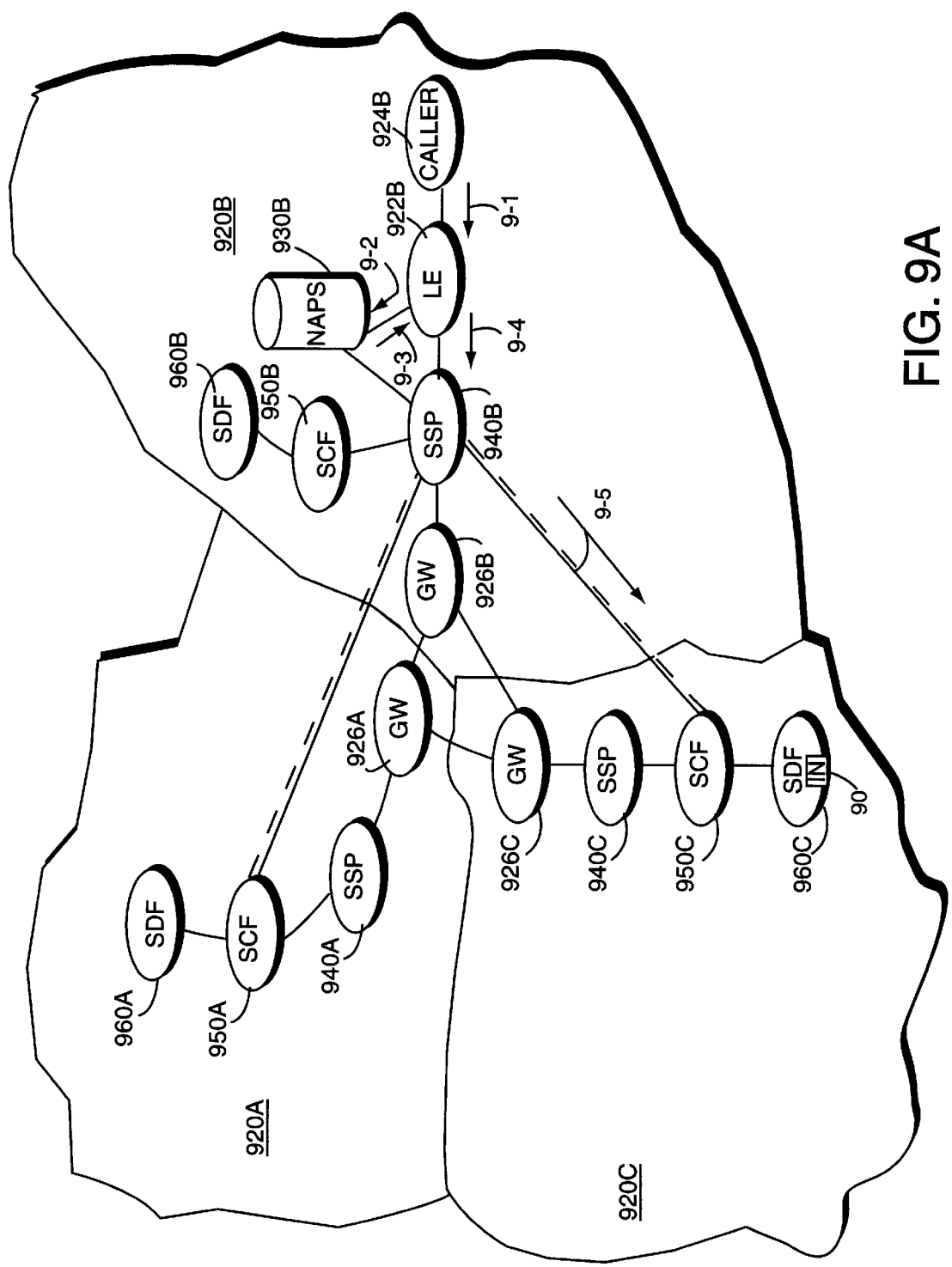
FIG. 9A is a schematic view showing routing in the telecommunications system of FIG. 9 in the event of porting of the IN service to another telephone service operator network.

FIG. 9A shows routing in the event that the IN service dialed by caller 924B were to change telephone service operators, moving from domain 920A into domain 920C. Upon completion of the change of telephone service operators, the IN service is performed at SCF 950C upon data stored at SDF 960C. When the change occurs, database 930B (and any other relevant databases) is updated to associate with the address of SCF 950C and the address of SSP 940B with the directory number for the IN service.

Actions 9-1 through 9-4 of FIG. 9A are identical to comparably numbered actions of FIG. 9, it being understood that the address of SCF 950C and the address of SSP 940B are returned by database 930B in action 9-3. In action 9-5, SSP 940B uses the address of SCF 950C obtained from the routing message as Global Title (GT) when routing in the CCITT Signal No. 7 network to SCF 950C.

Figure 10:
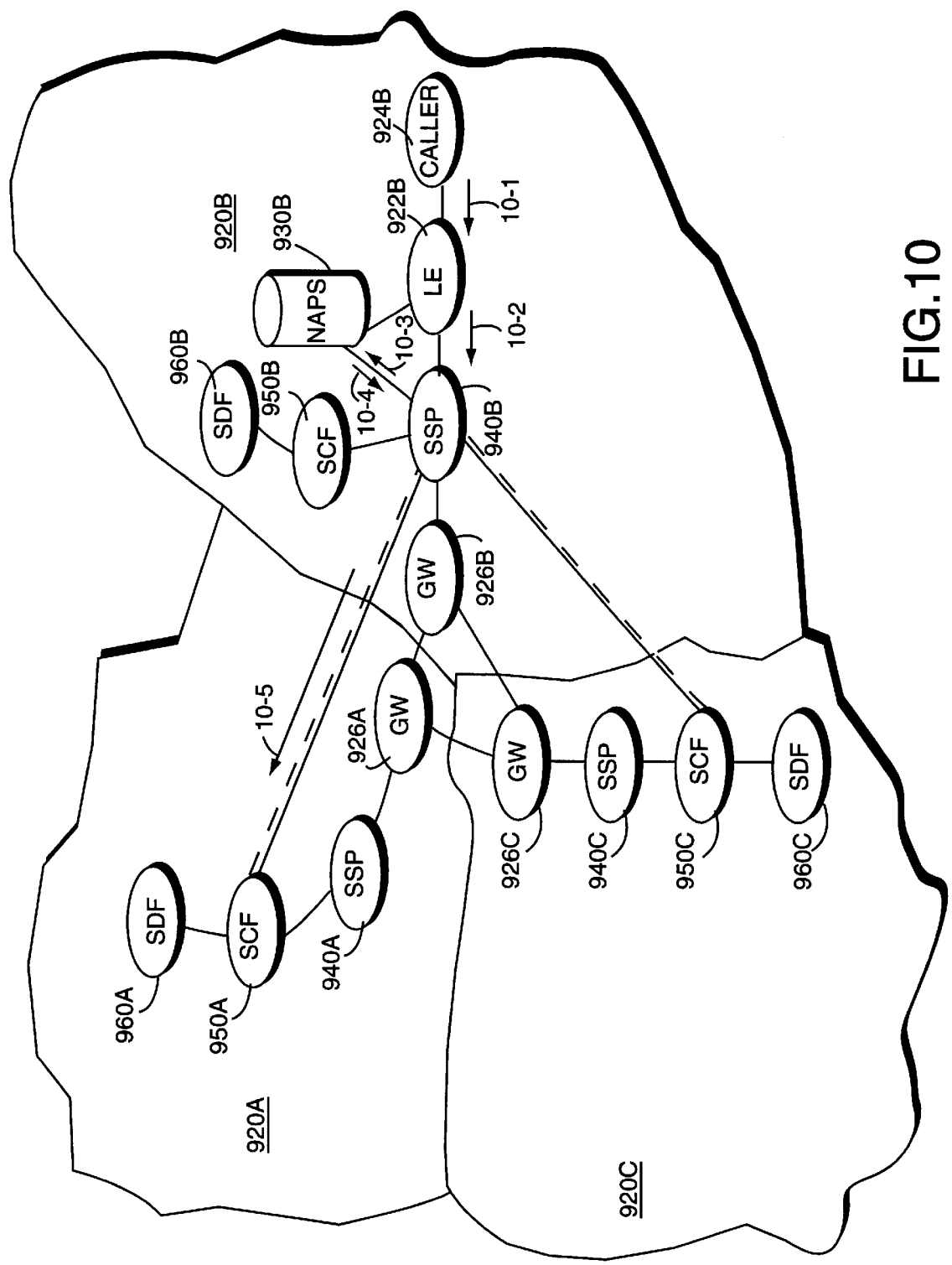
FIG. 10 is a schematic view of a telecommunications system having routing to a service control function (SCF) of the telephone service operator network of the recipient IN service from a signal switching function outside of the telephone service operator network of the recipient service, with an SSP querying a database to obtain routing information.

FIG. 10 differs from the mode of the invention shown in FIG. 9 in that SSP 940B, not local exchange 922B, queries database 930B in connection with routing of the IN service call (it is assumed in FIG. 10 that the IN service still subscribes to the operator of domain 920A and that the IN service is performed by SCF 950A). In FIG. 10, at action 10-2 local exchange 922B forwards the directory number of the IN service to SSP 940B. At action 10-3 SSP 940B performs the query of database 930B, in much the same manner as did local exchange did local exchange 922B in FIG. 9. Action 10-4 shows database 930B returning to SSP 940B the address of the SCF 950A whereat the IN service is performed. In like manner as with FIG. 9, SSP 940B uses the address of SCF 950A obtained from database 930B as Global Title (GT) when routing in the CCITT Signal No. 7 network to SCF 950A, as shown by action 9-5. With the call properly routed, SCF 950A, using data obtained from SDF 960A, performs the IN service requested by caller 924B.

From the foregoing description of FIG. 9A it can be understood from analogy what happens should, in the FIG. 10 mode, the IN service changes telephone service operators (e.g., moves to domain 920C).

In the foregoing illustrations, database 930B need not necessarily return the entire SCF address to the SSP 940B, but could instead return a pointer which the SSP could map to a real SCF address. However, provision by database 930B of the entire SCF address to the SSP 940B advantageously enables an IN service to be ported to another SCF without requiring the SSP to be updated with any new address translation information regarding the new SCF. By allowing an SSP outside of the domain which provides the IN service to interwork/initiate the IN service, the extent of circuitry involved in the transit network is reduced.

Figure 13:
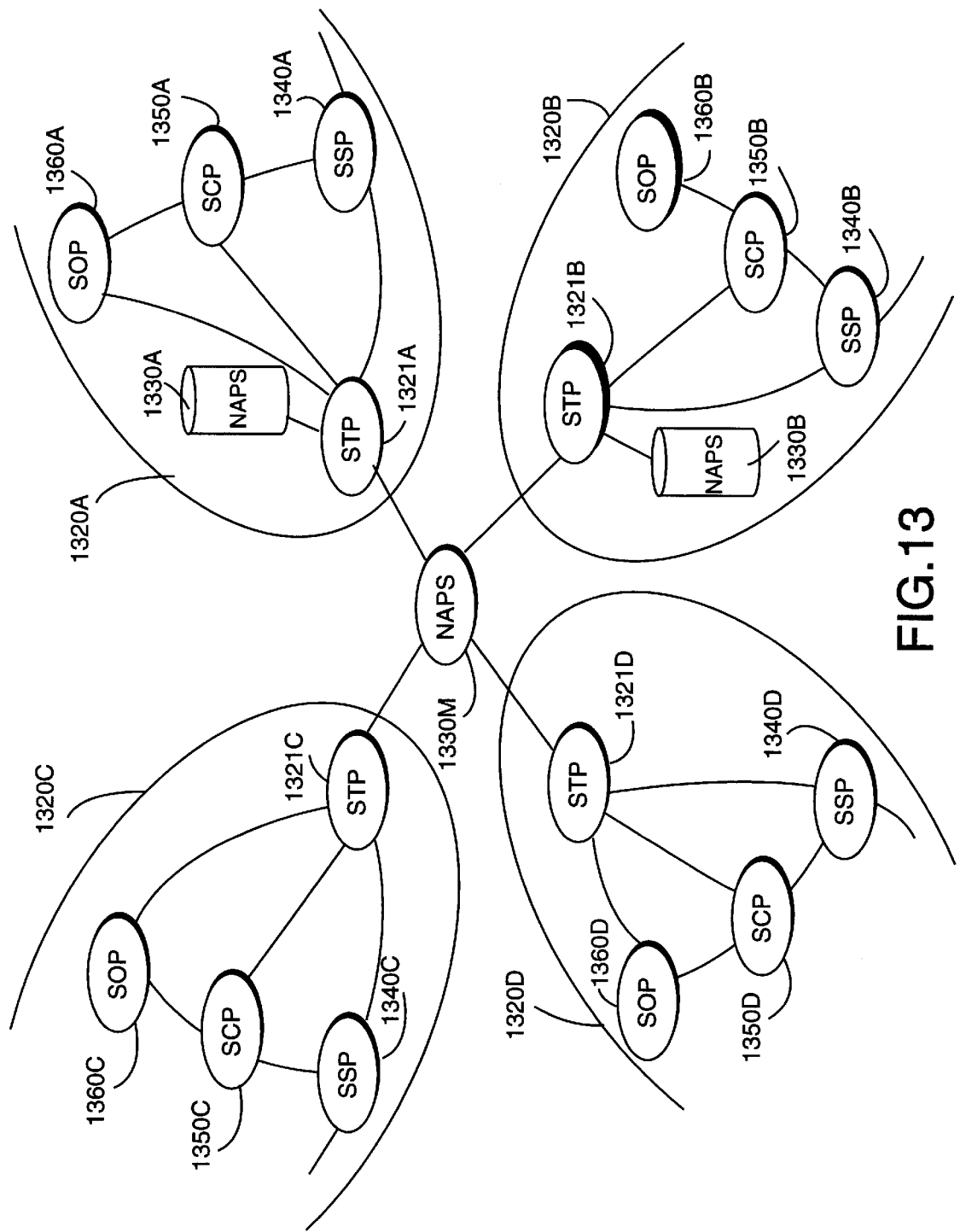
FIG. 13 is a schematic view of a telecommunications system according to another embodiment of the present invention wherein a NAPs server is employed as a Global Title translator for SCCP messages.

FIG. 13 shows a telecommunications system wherein a NAPs server is employed as a Global Title translator for SCCP messages. Four domains 1320A–1320D are shown in the system of FIG. 13. Each domain 1320 has a signal transfer point (STP) 1321 to which is connected both a service control point (SCP) 1350 and a service data point (SDP) 1360. Each service control point (SCP) 1350 is connected to the service data point (SDP) 1360 whose data the SCP 1350 utilizes, as well as to a signal switching point 1340 of the domain. The STPs 1321 of domains 1320A and 1320B are shown as being connected to resident databases (NAPs) 1330A and 1330B, respectively.

In FIG. 13 a centralized node 1330M is connected to STPs 1321 of each of domains 1320. Centralized node 1330M includes a NAPs database which functions as Global Title translator for SCCP messages routed to node 1330M. In the embodiment of FIG. 13, SCPs and SDPs need not know that an IN service has been ported, since centralized node 1330M w i th its NAPs sets up the correct routing.

It should be understood in FIG. 13 that the SDP is used interchangeably with SDF and SCP is used interchangeably with SCF. Likewise, as a variant of FIG. 13, each domain 1320 can have its own distributed version of the NAPs which resides at node 1330M and c an consult its distributed version rather than a centralized node for Global Title translation and the like.

Figure 14:
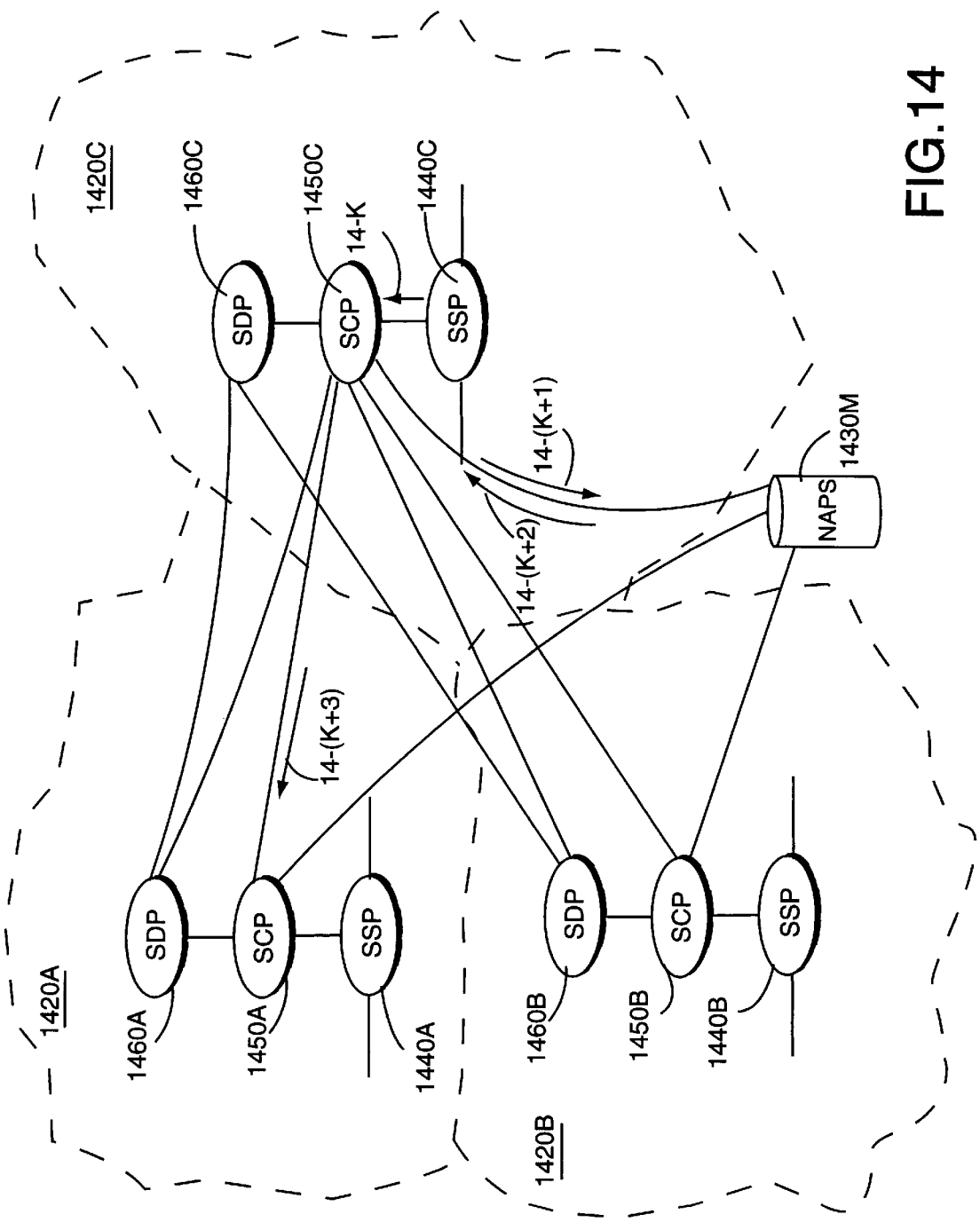
FIG. 14 is a schematic view of a telecommunications system according to another embodiment of the present invention wherein a signal control point accesses a database to determine how IN services have been ported.

FIG. 14 shows another embodiment of a telecommunications system wherein signal control points access a database in which to determine how IN services have been ported. Three domains 1420A–1420c are shown in the system of FIG. 14. Each domain 1420 has a signal switching point (SSP) 1440 to which is connected both a service control point (SoP) 1450 and a service data point (SDP) 1460. Each service control point (SCP) 1450 is connected to the service data point (SDP) 1460 whose data the SCP 1450 utilizes, as well as to a signal switching point 1440 of the domain. The SDPs 1450 are connected to a centralized NAPs database 1430M.

FIG. 14 additionally shows that an SCP 1450 of one domain is connected to both SCPs and SDPs of other domains, and th at an SDP of one domain is connected to an SDP of the other domain. For example, SOP 1450C is connected to SCP 1450A and SDP 1460A of domain 1420A and to SCP 1450C and SDP 1460C of domain 1420C; SDP 1460C is connected to SDP 1460A and SDP 1460B.

In the system of FIG. 14, suppose that SCP 1450C had previously handled a particular non-geographical number (e.g., IN service), but that such number (e.g., IN service) has now been ported to domain 1420A and is handled by SCP 1450A based on data now stored at SDP 1460A. Since the non-geographical directory number remains the same despite the porting of the IN service, in the particular embodiment of FIG. 14 the call to the IN service is routed to the old telephone service operator, and particularly to SCP 1450C as shown by action 14-K. Upon receiving a call for an IN service which it does not have, SCP 1450C queries NAPs database 1430M as indicated by action 14-(K+1) to determine what telephone service operator (e.g., which domain) now handles the IN service which has been ported from domain 1420C. Action 14-(K+2) shows the address of the SCP which currently handles the ported IN service—particularly the address of SCP 1450A—being routed to SCP 1450C. SCP 1450B then uses the address of SCP 1450A to route the call to SCP 1450A as indicated by action 14-(K+3). SCP 1450A then handles the call using data obtained for the IN service from SDP 1460A.

It should be understood also in FIG. 14 that the SDP is used interchangeably with SDF and SCP is used interchangeably with SCF. Likewise, as a variant of FIG. 14, each domain 1420 can have its own distributed version of the NAPs which resides at node 1430M and can consult its distributed version rather than a centralized database such as database 1430M.

It should also be understood that an intelligent network (IN)-type service has been described in the embodiments herein as merely examples of one type of non-geographical number which can be ported according to principles of the invention, and that the invention is not to be construed as to be limited only to IN services. Rather, the invention has broad applicability to portable non-geographical numbers generally.

In the foregoing examples, for sake of illustration database 30G has returned the addresses of various nodes of the domain handling the called service as part of the called party parameter CdPN, particularly in the Address Signal Field (ASF) thereof. It should be understood, however, that an important aspect of the present invention is that database 30G return such addresses in a manner usable by a gateway node of the service-handling domain. Accordingly, insertion of these addresses is not confined to the Address Signal Field (ASF) of the CdPN parameter, or even to the CdPN parameter. Rather, these addresses can be applied to a gateway node in other forms, such as in other parameters permitted by the particular protocol being implemented.

In the preceding discussion, it should be understood that the term "address", used for example with reference to gateway node address, can also be a node identifier.

Whereas the databases 30 have been illustrated as being separate and distinct from network nodes in other embodiments databases 30 are included as components of the network nodes and accordingly do not involve any external signaling.

While the invention has been particularly shown and described with reference to the preferred embodiments thereof, it will be understood by those skilled in the art that various alterations in form and detail may be made therein without departing from the spirit and scope of the invention. For example, it should be understood that the number (four) of domains shown in FIG. 1 is for illustrative purposes only, and that a greater or lesser number of domains may be employed.

The embodiments of the invention in which an exclusive property or privilege is claimed are defined as follows:

1. A telecommunications network comprising a set of domains, wherein a call-originating domain included in the set of domains uses a portable directory number of an intelligent network-tee service to access a non-geographic service number database to obtain information to be included as a parameter in a routing message for routing a call made from the call-originating domain to the intelligent network-type service, and wherein the information includes an address of a node in a non-originating domain which currently handles the intelligent network-type service, the non-originating domain being included in the set of domains and the intelligent network-type service being performed by a service control function (SCF) of the non-originating domain.

2. The network of claim 1, wherein the information obtained from the non-geographic service number database includes an address of a gateway node of the non-originating domain.

3. The network of claim 1, wherein the information obtained from the non-geographic service number database includes an address of a service switching point (SSP) in the nonoriginating domain.

4. The network of claim 1, wherein the information obtained from the non-geographic service number database includes an address of a service control point (SCP) whereat resides the service control function (SCF) which performs the intelligent network-type service in the non-originating domain.

5. The network of claim 1, wherein the information obtained from the non-geographic service number database includes an address of a service data function (SDF) whereat data for the intelligent network-type service is stored.

6. The network of claim 1, wherein the non-geographic service number database is accessed by a gateway node of the call-originating domain.

7. The network of claim 1, wherein the non-geographic service number database is accessed by a transit exchange node of the call-originating domain.

8. The network of claim 1, wherein a service control point (SCP) in a domain which formerly handled the intelligent network-type service receives a call for the intelligent network-type service and accesses the non-geographic service number database to determine which domain currently handles the intelligent network-type service, and wherein the service control point (SCP) in the domain which formerly handled the intelligent network-type service routes the call to a service control point (SCP) in the domain which currently handles the intelligent network-type service.

9. The network of claim 1, wherein the non-geographic service number database is located in the call-originating domain.

10. The network of claim 1, wherein the non-originating domain comprises a database which is queried to determine an address of at least one of the following:

(1) a service switching point (SSP) in the non-originating domain which is to be utilized to reach the intelligent network-type service;

(2) the service control function (SCF) or service control point (SCP) which is to be utilized by the intelligent network-type service;

(3) a service data function (SDF) or service data point (SDP) which is to be utilized by the intelligent network-type service.

11. The method of claim 10, wherein the node is a gateway node of a non-originating domain.

12. The network of claim 1, wherein the non-originating domain comprises a database which is queried as follows.

(1) by the node of the non-originating domain to determine an address of a service switching point (SSP) in the non-originating domain which is to be utilized to reach the intelligent network-type service;

(2) by the service switching point (SSP) in the non-originating domain to determine an address of the service control function (SCF) or service control point (SCP) which is to be utilized by the intelligent network-type service;

(3) by the service control function (SCF) or the service control point (SCP) in the non-originating domain to determine an address of a service data function (SDF) or service data point (SDP) which is to be utilized by the intelligent network-type service.

13. The network of claim 1, wherein the database is accessed by a local exchange node of the call-originating domain.

14. A telecommunications network comprising a set of domains, wherein a call-originating domain included in the set of domains accesses a database to obtain routing information, wherein the routing information includes both an address of a signal switching point node in the originating domain and an address of a service control function node of a non-originating domain, the non-originating domain being included in the set of domains, and wherein the signal switching point node in the originating domain communicates with the service control function node of the non-originating domain for execution of a call.

15. The network of claim 14, wherein the database is accessed by a gateway node of the call-originating domain.

16. The network of claim 14, wherein the database is accessed by a transit exchange node of the call-originating domain.

17. The network of claim 14, wherein the database is accessed by a local exchange node of the call-originating domain.

18. A method of routing calls through a Telecommunications network, the telecommunications network having a set of domains, the method comprising:
   using a directory number of an intelligent network-type service to access, in a call-originating domain included in the set of domains, a non-geographic service number database to obtain an address of a node of a telecommunications domain which currently handles the intelligent network-type service; and
   including the address of the node of the telecommunications domain which currently handles the intelligent network-type service as a parameter in a routing message for routing a call made from the call-originating domain to the node, the telecommunications domain which currently handles the intelligent network-type service being included in the set of domains and the intelligent network-type service being formed by a service control function (SCF) of the non-originating domain.

19. The method of claim 18, where the node is a gateway node of the non-originating domain.

20. The method of claim 18, wherein the node is a service switching point (SSP) in a non-originating domain.

21. The method of claim 18, wherein the node is a service control point (SCP) whereat resides the service control function (SCE) which performs the intelligent network-type service in a non-originating domain.

22. The method of claim 18, wherein the node is a service data function (SDF) whereat data for the intelligent network-type service is stored.

23. The method of claim 18, wherein the non-geographic service number database is accessed by a gateway node of the call-originating domain.

24. The method of claim 18, wherein the non-geographic service number database is accessed by a transit exchange node of the call-originating domain.

25. The method of claim 18, wherein the non-geographic service number database is accessed by a service control point (SCP) in a domain which formerly handled the intelligent network-type service upon reception of a call to the intelligent network-type service by the service control point (SCP) in a domain which formerly handled the intelligent network-type service, and
   wherein the service control point (SCP) in the domain which formerly handled the intelligent network-type service routes the call to a service control point (SCP) in the domain which currently handles the intelligent network-type service.

26. The method of claim 18, wherein the non-geographic service number database is located in the call-originating domain.

27. The method of claim 18, further comprising providing a database in the non-originating domain which is queried to determine an address of at least one of the following:
   (1) a service switching point (SSP) in the non-originating domain which is to be utilized to reach the intelligent network-type service;
   (2) the service control function (SCF) or service control point (SCP) which is to be utilized by the intelligent network-type service;
   (3) a service data function (SDF) or service data point (SDP) which is to be utilized by the intelligent network-type service.

28. The method of claim 27, wherein the database of the non-originating domain returns a global title as the address.

29. The method of claim 18, further comprising providing a database in the non-originating domain which is queried as follows:
   (1) by the node in the non-originating domain to determine an address of a service switching point (SSP) in the non-originating domain which is to be utilized to reach the intelligent network-type service;
   (2) by the service switching point (SSP) in the non-originating domain to determine an address of the service control function (SCF) or service control point (SCP) which is to be utilized by the intelligent network-type service;
   (3) by the service control function (SCF) or the service control point (SCP) in the non-originating domain to determine an address of a service data function (SDF) or service data point (SDP) which is to be utilized by the intelligent network-type service.

30. The method of claim 18, wherein the non-geographic service number database is accessed by a local exchange node of the call-originating domain.

31. A method of routing calls through a telecommunications network, the telecommunications network having a set of domains, the method comprising:
   accessing, in a call-originating domain included in the set of domains, a database to obtain an address of a node of a telecommunications domain which currently handles an intelligent network-type service, the telecommunications domain which currently handles the intelligent network-type service being included in the set of domains;
   including the address of the node of the telecommunications domain which currently handles the intelligent network-type service as a parameter in a routing message for routing a call made from the call-originating domain to the node;
   wherein the information obtained from the database includes an address of a signal switching point node in the originating domain and an address of a service control function node of a non-originating domain, and
   wherein the signal switching point node in the originating domain communicates with the service control function node of the non-originating domain for executing the intelligent network-type service.

32. The method of claim 15, wherein the non-geographic service number database is accessed by a gateway node of the call-originating domain.

33. The method of claim 15, wherein the non-geographic service number database is accessed by a transit exchange node of the call-originating domain.

34. The method of claim 15, wherein the non-geographic service number database is accessed by a local exchange node of the call-originating domain.

35. A telecommunications network comprising a set of domains, wherein a service switching point (SSP) of a call-originating domain included in the set of domains communicates with a service control point (SCP) in a domain which formerly handled a called intelligent network-type service, the domain which formerly handled the called intelligent network-type service being in the set of domains, whereby the service control point (SCP) in the domain which formerly handled the called intelligent network-type service determines that the called intelligent network-type service is no longer handled by the domain which formerly handled the called intelligent network-type service and thereupon accesses a database Lo obtain routing information, the routing information including an address of a service control point (SCP) of a domain currently handling the called intelligent network-type service for execution of the called intelligent network-type service, the domain currently handling the called intelligent network-type service being in the set of domains and the intelligent network-type service being performed by a service control function (SCF) of the non-originating domain.

36. A method of routing calls through a telecommunications network, the telecommnunications network having a set of domains, the method comprising:

using a service switching point (SSP) of a call-originating domain included in the set of domains to communicate with a service control point (SCP) in a domain which formerly handled a called intelligent network-type service, the domain which formerly handled the called intelligent network-type service being in the set of domains;

using the service control point (SCP) in the domain which formerly handled the called intelligent network-type service to determine that the called intelligent network-type service is no longer handled by the domain which formerly handled the called intelligent network-type service; and thereupon accessing a database to obtain routing information, the routing information including an address of a service control point (SCP) of a domain currently handling the called intelligent network-type service for execution of the called intelligent network-type service, the domain currently handling the called intelligent network-type type service being in the set of domains and the intelligent network-type service being performed by a service control function (SCF) of the domain currently handling the called indwelling network-type service.

37. A telecommunications network comprising a set of domains, wherein a call placed to a called entity having a portable directory number is routed to a service control point (SCP) in a domain which formerly handled the called entity, and wherein the service control point (SCP) in the domain which formerly handled the called entity accesses a database to determine which domain currently handles the called entity and which obtains information to be included as a parameter in a routing message for routing the call, and wherein the service control point (SCP) in the domain which formerly handled the called entity routes the call to a service control point (SCP) in the domain which currently handles the called entity, the domain which formerly handled the called intelligent network-type service and the domain which currently handles the called intelligent network-type service being in the set of domains and the intelligent network-type service being performed by a service control function (SCF) of the domain which currently handles the called intelligent network-type service.

38. A method of routing calls through a telecommunications network, the telecommunications network having a set of domains, the method comprising:

routing a call placed to a called entity having a portable directory number to a service control point (SC P) in a domain which formerly handled the called entity, the domain which formerly handled the called intelligent network-type service being in the set of domains;

accessing, from the service control point (SCP) in the domain which formerly handled the called entity, a database to determine which domain currently handles the called entity and for obtaining information to be included as a parameter in a routing message for routing the call, the domain which currently handles the called intelligent network-type service being in the set of domains; and routing the call from the service control point (SCP) in the domain which formerly handled the called entity routes to a service control point (SCP) in the domain which currently handles the called entity, the intelligent network-type service being performed by a service control function (SCF) of the domain which currently handles the called intelligent network-type service.

* * * * *